Oct. 26, 1943.  J. B. ARMITAGE  2,332,684
ADJUSTING AND LOCKING DEVICE
Filed Oct. 26, 1939  3 Sheets-Sheet 1

INVENTOR
JOSEPH B. ARMITAGE
BY W. D. O'Connor
ATTORNEY

Oct. 26, 1943.  J. B. ARMITAGE  2,332,684
ADJUSTING AND LOCKING DEVICE
Filed Oct. 26, 1939  3 Sheets-Sheet 2
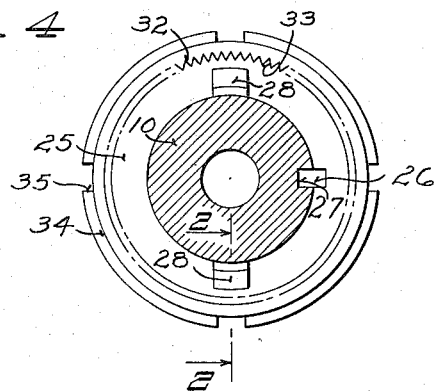
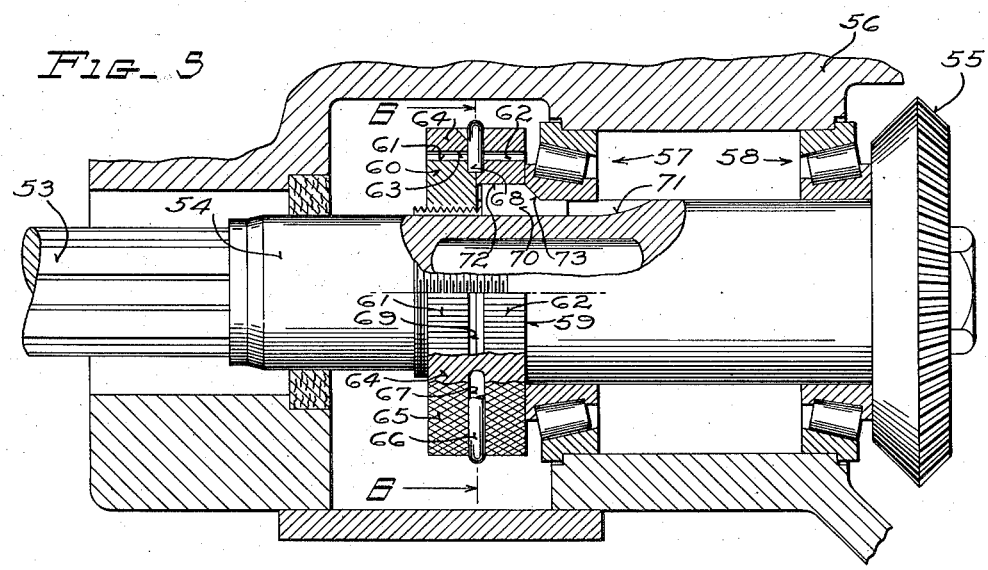
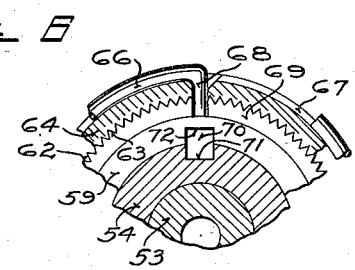
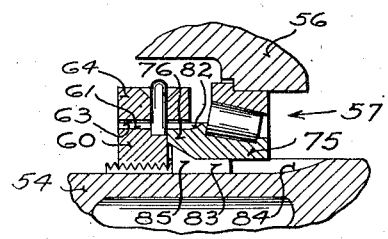
INVENTOR
JOSEPH B. ARMITAGE
BY W. D. O'Connor
ATTORNEY

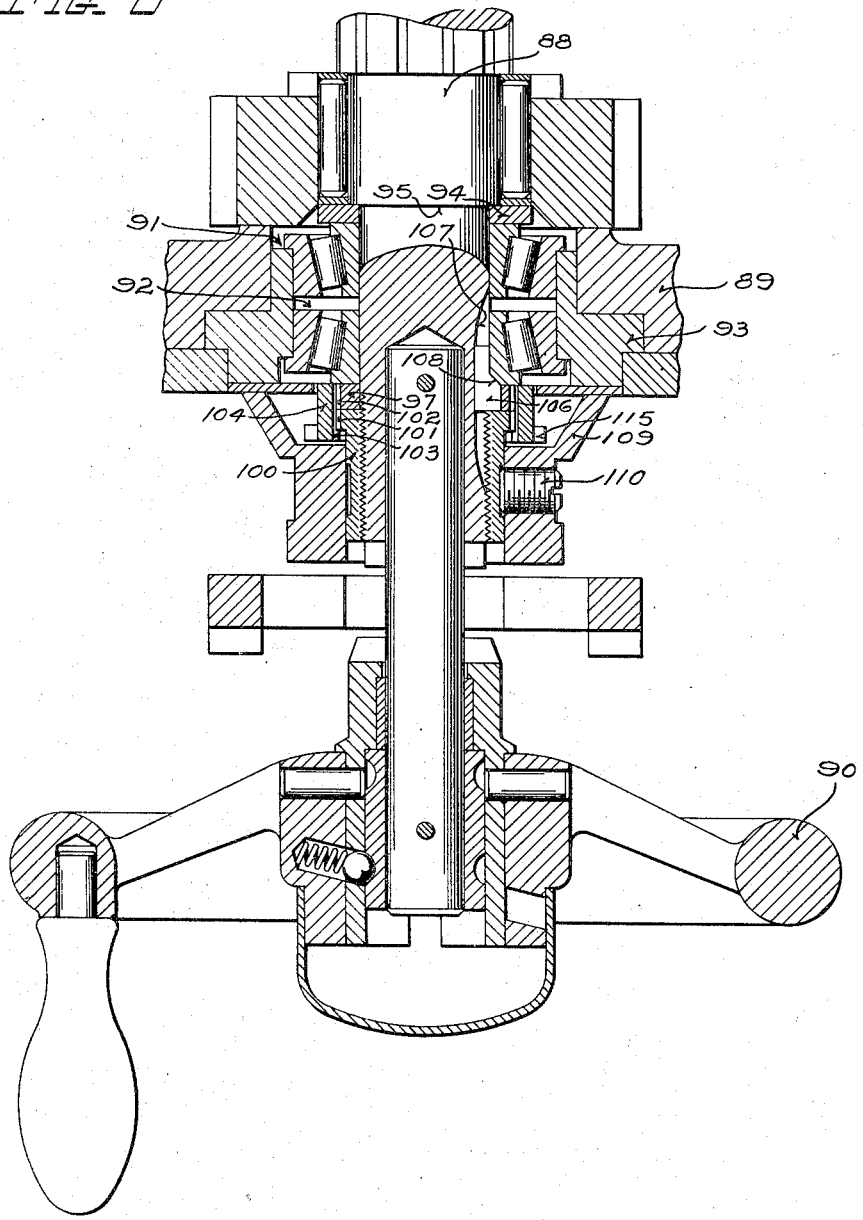

Patented Oct. 26, 1943

2,332,684

UNITED STATES PATENT OFFICE 2,332,684

ADJUSTING AND LOCKING DEVICE

Joseph B. Armitage, Wauwatosa, Wis., assignor to Kearney & Trecker Corporation, West Allis, Wis., a corporation of Wisconsin Application October 26, 1939, Serial No. 301,355

16 Claims. (Cl. 151—29)

This invention relates generally to improvements in retaining devices for machine elements, and more particularly to an improved adjusting and locking device of the type especially suitable for use with anti-friction bearings and the like.

This specification constitutes a continuation in part of co-pending application Serial No. 86,382, filed June 20, 1936, which issued December 5, 1939, as Patent No. 2,182,421, and of co-pending application Serial No. 220,648, filed July 22, 1938, which issued August 25, 1942, as Patent No. 2,293,880.

The primary object of this invention is to provide improved adjusting and locking means for precisely positioning and securely retaining cooperating elements of a machine in predetermined relationship;

Another object of the invention is to provide an improved machine element locking means which may be engaged or disengaged readily to facilitate adjustment of the element;

Another object is to provide improved locking means capable of being engaged and disengaged repeatedly without detriment to itself or to the elements retained by it;

Another object is to provide improved means for retaining relatively rotatable members in accurately predetermined angular relationship;

Another object is to provide an improved nut locking device;

Another object is to provide improved adjusting and locking means for an anti-friction bearing; and A further object is to provide an improved adjustable anti-friction bearing;

According to this invention, relatively movable members are retained in precisely predetermined relationship by a locking device including an element slidably mounted on one member and presenting serrations or the like adapted to be moved into locking engagement with another member. In the case of a locking nut, such as may be used for adjusting an anti-friction bearing, the locking element may be in the form of a sleeve carried by the nut and axially slidable into locking engagement with a cooperating element associated with the bearing for retaining it in adjustment. Preferably, both the adjusting nut and the bearing element are provided with matching peripheral serrations, and the locking sleeve is provided with complementary internal serrations disposed to slidably engage the aligned external serrations of the nut and the bearing element simultaneously to lock them together. The locking sleeve is normally carried by the nut when disengaged from the bearing element and it may be provided with external gripping means for engagement by a wrench or the like to turn the nut. The locking serrations of the bearing element may be formed in a collar or the like that is retained against rotation relative to the bearing race, or alternatively they may be formed directly in the adjustable bearing race. After the bearing has been adjusted by turning the nut, the serrations on the nut are aligned with the matching serrations on the bearing element, and the locking sleeve is then moved axially along the nut into locking engagement with the bearing element. A spring ring or the like may be utilized to retain the locking sleeve in locking position, or in some instances, the sleeve may be retained by means of a collar or other machine element that is moved into abutting relationship with it after the bearing has been adjusted.

The foregoing and other objects of this invention, which will become more fully apparent from the following detailed specification, may be achieved by means of the exemplifying embodiments thereof depicted in and described in connection with the accompanying drawings, in which:

Fig. 4 is a view taken in transverse section through the spindle on the plane indicated by the line 4—4 in Fig. 1, showing the nut locking means in end elevation;

Fig. 5 is a fragmentary view in longitudinal section of a machine structure showing a portion of a driving shaft mounted in anti-friction bearings provided with adjusting means embodying the invention;

Fig. 6 is a fragmentary detail view of the bearing adjusting means, taken in transverse section on the plane indicated by the line 6—6 in Fig. 5;

Fig. 7 is a fragmentary view in longitudinal section generally similar to part of Fig. 5 but showing a modified form of the bearing adjusting mean; and Fig. 8 is a fragmentary view of part of a milling machine, taken in longitudinal section and showing a portion of a machine element feeding shaft supported in anti-friction bearings provided with adjusting means constituting another embodiment of the invention.

Figure 1:
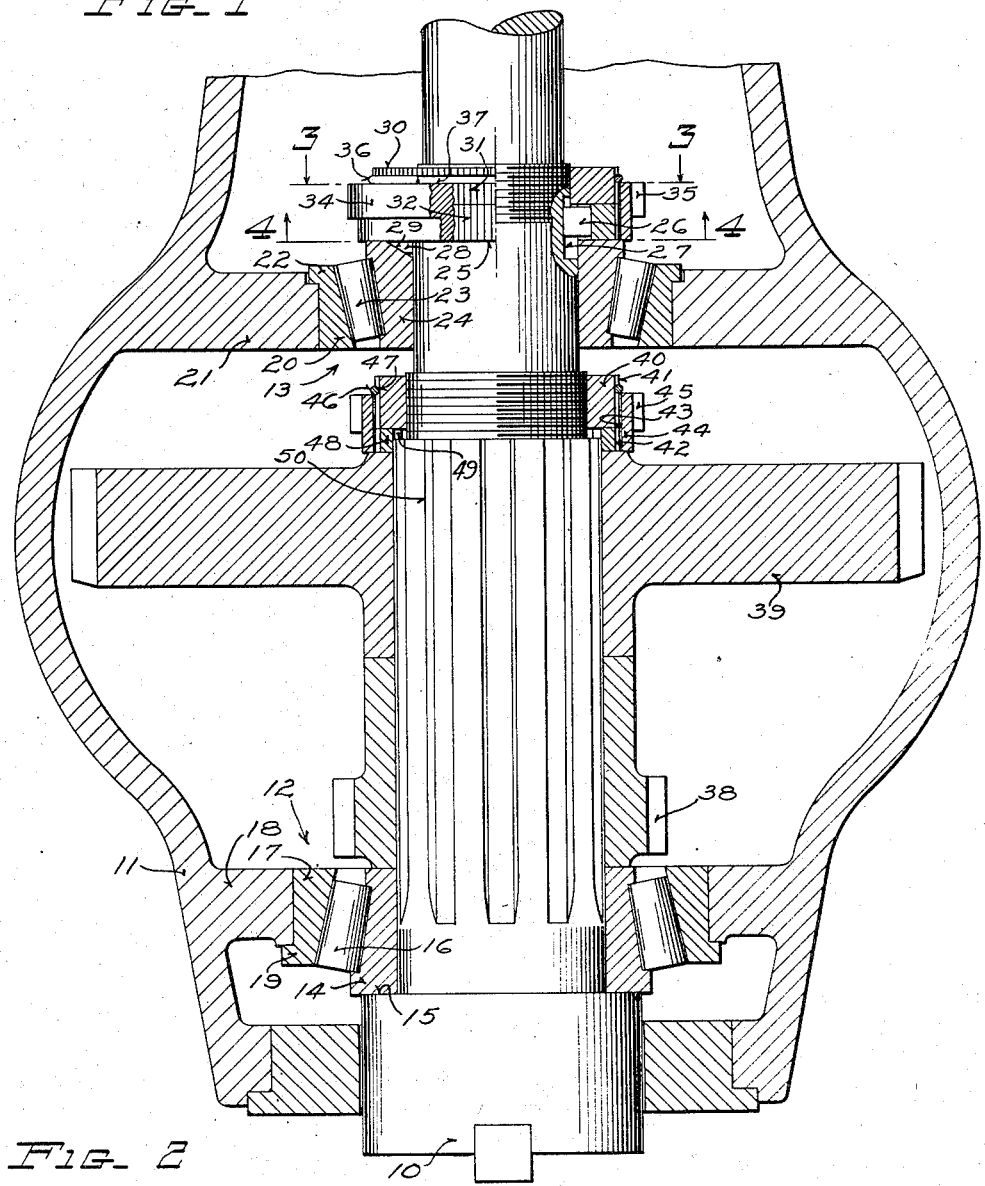
Figure 1 is a view, taken generally in vertical section, of a portion of a machine tool showing a cutter carrying spindle provided with a bearing adjusting nut and a gear retaining nut, both equipped with locking means constituting embodiments of the present invention.

The structure shown in Fig. 1 incorporating illustrative embodiments of the invention, is a portion of the spindle supporting head of a vertical spindle milling machine which is shown and described in full in co-pending application Serial No. 350,666, filed August 3, 1940. As shown in the drawings, the adjusting and locking device of the present invention is there applied to a virtically disposed tool carrying spindle 10 which is rotatably supported in a spindle head structure or housing 11 by means of a pair of opposed tapered roller anti-friction bearings constituted by a lower bearing 12 and an upper bearing 13. To provide for supporting the spindle rigidly, the opposed tapered race and cone bearings 12 and 13 are adapted to resist both radial and axial loads and are arranged to be adjusted toward each other to tighten them in manner to maintain the spindle 10 in accurately predetermined operating position.

The lower bearing 12 adjacent to the tool carrying end of the spindle, comprises an inner bearing race or cone 14 fitted on the spindle 10 in abutting relationship with a shoulder 15 thereof in manner to oppose forces exerted upon the spindle in the upward direction. The cone 14 constitutes a raceway for and is engaged by a series of tapered rollers 16 disposed to engage also and operate within an outer bearing race or cup 17 that is supported in a transverse web 18 constituting part of the housing 11. As shown, the bearing cone 17 is provided with a shoulder 19 which engages the web 18 in manner to transmit to it forces exerted upward from the spindle 10 through the bearing cone 14 and rollers 16.

The upper bearing 13 comprises an outer race or cup 20 which is carried in a transverse web 21 constituting part of the housing 11, the cup having a shoulder 22 which engages the web 21 in manner to transmit to it downwardly exerted forces in opposition to the upwardly exerted forces transmitted to the housing by the lower bearing structure 12. The cup 20 constitutes the outer raceway for a series of tapered rollers 23 which also roll upon an inner raceway or cone 24 that is slidably mounted on the spindle 10, the arrangement being such that the cone 24 may be moved along the spindle in manner to effect adjustment of both the upper and the lower bearings.

Figure 2:
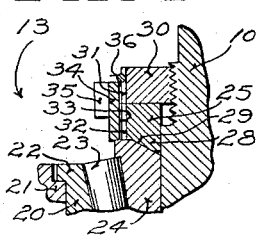
Fig. 2 is a fragmentary view taken in longitudinal section through the bearing adjusting nut and locking means, on the plane indicated by the line 2—2 in Fig. 4.
Figure 3:
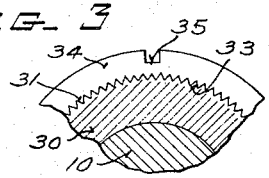
Fig. 3 is a fragmentary view taken in transverse section through the adjusting nut on the plane indicated by the line 3—3 in Fig. 1.

As appears in Figs. 1 and 4, the upper cone 24 is engaged by a spacing collar 25 that is slidably keyed to the spindle 10 by means of a key 26 tightly fitted in the collar and slidably fitted in a keyway 27 in the spindle, in manner to prevent relative rotation between the spindle and the collar. The collar 25 also serves to prevent the cone 24 from turning relative to the spindle 10, it being provided for this purpose with a pair of diametrically disposed axially projecting lugs 28 which engage complementary sockets 29 in the end of the cone 24, as appears in Figs. 1 and 2, the arrangement being such that the cone 24 is splined for axial movement only on the spindle 10. For adjusting the axial position of the bearing cone 24, there is provided an adjusting nut 30 that is rotatably threaded on the spindle 10 as appears in Figs. 1 and 2, and abuts against the collar 25 in manner to transmit to the bearing forces exerted in the downward direction upon the spindle, the arrangement being such that the nut may be turned relative to the collar in effecting the axial adjusting movement.

In order to lock the nut 30 against unintentional turning movement relative to the spindle 10 after the bearings have been adjusted, both the nut and the keyed collar 25 are provided on their peripheries with circular series of closely spaced axially disposed matching serrations 31 and 32, respectively. The external serrations 31 and 32 are adapted when disposed in registering alignment to be engaged by complementary internal locking serrations 33 formed on the inner surface of a locking collar or sleeve 34, that may be positioned to encircle both the nut 30 and the spacing collar 25, as shown in the drawings. In order to unlock the nut 30 for turning it to adjust the bearings, the locking sleeve 34 may be retracted by moving it axially along the surface of the nut until its serrations 33 have moved out of engagement with the serrations 32 of the spacing collar. The locking sleeve 34 is preferably maintained in engagement with the nut 30 when in its unlocked position and it is provided with peripheral notches 35 which may be engaged by a spanner wrench or the like for turning the nut the amount required to effect the desired adjustment of the bearings. In approaching the position of final adjustment of the bearings, the serrations 31 on the nut 30 are moved into axial registering alignment or matching relationship with the serrations 32 on the spacing collar 25 at any one of numerous positions of relative angular adjustment. To lock the nut, the locking sleeve 34 is then moved downwardly along the aligned serrations to engage both the nut and the spacing collar in the manner shown in Fig. 1 and previously explained. The serrated locking sleeve 34 may be held in locking position by suitable means such as a spring ring 36 that is adapted to be snapped into a circumferential complementary groove 37 in the periphery of the nut 30 in position to bear against the back of the sleeve for preventing upward retracting movement thereof.

In the machine structure shown in Fig. 1, the spindle 10 may be driven selectively at high speed by means of a small gear wheel 38 or at low speed by means of a large gear wheel 39 both splined on the spindle with the hub of the small gear 38 abutting the cone 14 of the lower bearing and the hub of the large gear 39 abutting the hub of the small gear. For retaining the gears on the spindle, there is provided a locking nut 40 threaded on the spindle above the large gear 39 and adapted to be tightened into clamping engagement with it. As shown, the nut 40 is provided with peripheral axially disposed serrations 41 adapted to be aligned with locking serrations 42 in an element fixed relative to the gear wheel 39, the aligned serrations being engaged by complementary serrations 43 on the inside of a cooperating locking sleeve 44.

As explained in connection with the bearing adjusting nut 30, the locking sleeve 44 is provided with peripheral notches 45 for receiving a spanner wrench that may be operated to turn the nut when the locking sleeve is retracted from engagement with the locking serrations 42. Likewise, a spring ring 46 is fitted in a peripheral groove 47 in the nut 40 for retaining the sleeve 44 in locking position. From the foregoing description, it is apparent that the gear retaining nut 40 and the associated locking arrangement is similar to the bearing adjusting nut 30 and its locking device, the principal difference being that the locking serrations 42 are formed on a collar or washer 48 interposed between the nut 40 and the hub of the gear 39 and that in this instance is provided with internal splines 49 which engage and cooperate with splines 50 on the spindle 10 constituting the driving connection between the gears 38 and 39 and the spindle.

The modification of the invention shown in Figs. 5 and 6 is associated with apparatus constituting a part of the spindle driving mechanism of a milling machine that is fully set forth in the said Patent 2,293,880. As shown, a spindle driving shaft 53 is fixed in an elongated hub 54 of a driving bevel gear 55 that is rotatably supported in a housing 56 by means of a pair of opposed tapered roller bearings 57 and 58, the cups or outer races of the bearings being fitted in the housing 56 in manner to oppose forces tending to move them toward each other. The cone of bearing 58 abuts against the body of the gear 55 and the cone of bearing 57 is slidably mounted on the gear hub 54 and is engaged by a spacing ring or collar 59 which is engaged, in turn, by an opposing adjusting nut 60 rotatably threaded on the gear hub 54. For supporting the gear rigidly, the nut 60 may be turned to force the collar 59 and the cone of bearing 58 towards the cone of bearing 57 to tighten the bearings against each other.

As in the previously described constructions, the nut 60 is provided with peripheral serrations 61 disposed in axial alignment with matching serrations 62 on the spacing ring 59 and adapted to be releasably engaged simultaneously by complementary locking serrations 63 on the inner surface of a locking sleeve 64. In this construction, the internally serrated locking sleeve 64 is provided on its periphery with a knurled surface 65 by means of which it may be turned, when retracted from engagement with the serrations in the spacing ring 59, to turn the nut 60 for adjusting the bearing. Turning movement of the nut 60 causes the spacing ring 59 and the cone of the bearing 57 to move along the gear hub 54 in manner to adjust the degree of tightness of the bearings 57 and 58. After the bearings have been adjusted and the serrations 61 and 62 moved into registering axial alignment, the serrations 63 of the locking sleeve 64 are again moved into locking engagement with the serrations 62 of the spacing ring 59, as shown in Fig. 5.

For retaining the locking sleeve 64 in locking position, the sleeve is encircled by a G spring 66 fitted in a groove 67 in its periphery and presenting at one end an inwardly projecting tang or key portion 68 that extends through a radial hole in the sleeve and snaps into a peripheral groove 69 formed between the nut 60 and the spacing ring 59 when the sleeve is in locking position. To release the locking sleeve 64 for adjusting the bearings, the resilient latching member or G spring is deflected outward by a suitable lifting tool to withdraw the tang 68 from the groove 69, whereupon the sleeve may be retracted from engagement with the spacing ring 59 to permit turning the nut.

The spacing or locking ring 59 is prevented from rotating relative to the gear hub 54 by means of a key 70 that is slidably fitted in a keyway 71 in the hub and that engages a complementary keyway 72 in the ring 59. The key 70 is further provided with an inclined locking element 73 which engages a complementary notch in the end of the cone of the bearing 57 to restrain it also from rotating relative to the hub 54, the spacing ring, cone and key being slidable axially along the hub 54 as a unit when the nut 60 is turned in effecting an adjusting movement.

The modification of the invention shown in Fig. 7 is similar in general construction to that shown in Fig. 5, the fragmentary view corresponding generally to the upper portion of the bearing 57 and the associated adjusting mechanism of Fig. 5. However, in this construction the bearing 57 is provided with a special inner race or cone element 75 having an integrally formed collar portion 76 that extends outwardly into abutting relationship with the adjusting nut 60 and that presents external serrations 82 formed directly on the race. The serrations 82 match the external serrations 61 on the nut 60 and are disposed to be engaged by the complementary internal serrations 63 of the locking sleeve 64. By this arrangement, the spacing collar shown between the adjusting nut and the bearing cone in the previously described constructions may be dispensed with. To prevent rotation of the cone 75 relative to the hub 54, there is provided a key 83 slidably fitted in a keyway 84 in the hub and provided with an angular radially projecting portion 85 that engages a complementary socket in the end of the cone 75, whereby the cone and the key may slide along the hub as a unit when the nut 60 is turned in effecting an adjustment of the bearings.

The embodiment of the invention shown in Fig. 8 constitutes adjusting means for the bearings of the cross feeding screw shaft of a milling machine that is fully set forth in the said Patent 2,182,421. As there shown, a cross feeding, or saddle traversing shaft 88 is rotatably supported in a forward wall 89 of the milling machine knee by means of double opposed tapered roller antifriction bearings 91 and 92 arranged to support the shaft in manner to resist both radial and axial loads. For turning the shaft 88 to move the saddle, the shaft is provided on its forward end with a hand wheel 90. The outer races or cups of the bearings 91 and 92 are carried in opposite ends of a sleeve 93 which is mounted in the wall 89 of the knee, the cups being so positioned therein as to oppose forces tending to move them toward each other. The inner race or cone of the rear or inner bearing 91 is fitted on the shaft 88 in abutting relationship with a spacing collar 94 which engages a shoulder 95 on the shaft in manner to resist forces tending to move the shaft 88 outward or forward. To provide for adjusting the bearings, the inner race or cone of the forward bearing 92 is slidably mounted on the shaft 88 for adjusting movement, and it is abutted by a spacing or locking collar 97 which is in turn abutted by an adjusting nut 100 that is threaded on the shaft 88 in manner to oppose forces tending to move the shaft inwardly.

As in the previously described embodiments, the adjusting nut 100 is provided with external axially disposed locking serrations 101 which match with similar serrations 102 on the periphery of the spacing or locking collar 97. To lock the nut 100 in adjusted position for preventing unintentional relative rotation between it and the shaft 88, the matching serrations 101 and 102 of the nut and the spacing collar are engaged by complementary internal serrations 103 of an encircling locking sleeve 104. With the locking sleeve 104 in engagement with the serrations of both the nut and the spacing collar as shown, the nut is locked securely to the spacing collar. The spacing collar, in turn, is prevented from rotating relative to the shaft 88 by means of a key 106 that is slidably fitted in a keyway 107 in the shaft and that engages a complementary keyway in the collar. The key 106 also serves to prevent rotation of the cone of the forward bearing 92 relative to the shaft by reason of an inclined portion 108 thereof engaging a complementary notch in the front of the bearing cone, the arrangement being such that the cone, the spacing collar and the key may be moved axially as a unit along the shaft when the adjusting nut is turned. The locking sleeve 104 is retained in locking position in this instance, by means of the collar of a micrometer dial 109 which is slidably mounted on a cylindrical portion of the nut 100 and is adapted to be secured in retaining engagement with the sleeve 104, and at any desired angular position relative to the shaft 88, by means of a locking screw or set screw 110.

In effecting adjustment of the bearings 91 and 92, the micrometer dial 109 is first released by loosening the locking screw 110 after which it is moved forward along the nut 100 to uncover the locking sleeve 104. The locking sleeve 104 is then likewise moved forward to a position in which it disengages the serrations 102 of the keyed spacing collar 97 but remains in engagement with the serrations 101 of the rotatable nut 100. To turn the nut, a spanner wrench or the like may be engaged with notches 115 in the periphery of the locking sleeve 104 and actuated to move both the sleeve and the nut in effecting the desired adjustment of the bearings. In completing the adjustment, the matching serrations on the nut and on the spacing collar are moved into registering alignment, after which the locking sleeve 104 may be moved inwardly to engage the serrations 102 of the collar for locking the nut in adjusted position. The micrometer dial 109 is then moved inwardly to its operating position and secured by tightening the locking screw 110, thereby retaining the locking sleeve 104 in the locking position, as shown.

Although the invention has been set forth herein by reference to several exemplary embodiments, it will be apparent that various other modifications of these illustrative structures may be effected without departing from the spirit and scope of the invention as defined in the subjoined claims.

The principles of the invention having been fully set forth, I hereby claim:

1. Adjusting mechanism for an anti-friction shaft bearing of the tapered race and cone type, comprising a cone splined for axial movement only on the shaft, an externally serrated spacing collar secured to said cone, a nut having external serrations similar to the serrations of said spacing collar mounted to abut said collar and rotatably threaded on said shaft for moving said collar axially to adjust the position of said cone, and a locking collar having internal serrations complementary to the external serrations of said spacing collar and said nut and slidably movable into engagement with both said spacing collar and said nut to prevent relative rotation thereof.

2. In a machine tool, the combination with a shaft and an adjustable anti-friction bearing unit for said shaft including an externally serrated element splined for axial movement only on said shaft, of an externally serrated adjusting nut rotatably threaded on said shaft adjacent to said externally serrated element, and a complementary internally serrated locking sleeve having wrench-receiving external surfaces and disposed to slidably engage the external serrations of said nut and said bearing element, said sleeve being operative when engaged with said nut only to provide for turning said nut to effect adjustment of said bearing and when engaged with both said nut and said bearing element to prevent relative rotation therebetween to maintain said adjustment.

3. In a machine tool, the combination with a shaft and an anti-friction bearing of the cone type mounted on said shaft, of an adjusting mechanism for said bearing including an externally serrated collar slidably splined for axial movement only on said shaft, an externally serrated nut rotatably threaded on said shaft adjacent to said collar for exerting force upon said bearing to adjust it, and an internally serrated locking collar complementary to said externally serrated collar and nut and slidably mounted thereon to be movable into engagement with both said nut and said collar for locking said nut against rotation.

4. In a machine tool, the combination with a shaft and an anti-friction bearing for said shaft, of means for adjusting said bearing including an adjusting nut rotatably threaded on said shaft adjacent to said bearing and provided with external serrations, a spacing collar splined for axial movement only on said shaft adjacent to said adjusting nut and provided with similar external serrations, a locking collar provided with internal serrations complementary to the external serrations on said nut and on said spacing collar, and a resilient latching member carried by said locking collar and operative to releasably retain said locking collar in locking engagement with the serrations of said adjusting nut and of said spacing collar in manner to prevent change in adjustment of said bearing.

5. In a machine tool, the combination with a shaft and an adjustable anti-friction bearing unit for said shaft including an externally serrated element splined for axial movement only on said shaft, of an externally serrated adjusting nut rotatably threaded on said shaft adjacent to said externally serrated element, and an internally serrated complementary locking sleeve disposed to slidably engage the serrations of said nut and said bearing element for preventing relative rotation therebetween after adjustment of said bearing.

6. Adjusting mechanism for an anti-friction shaft bearing of the tapered race and cone type, comprising an externally serrated spacing collar splined for axial movement only on the shaft adjacent to the cone of said bearing, a nut having external serrations similar to the serrations of said spacing collar rotatably threaded on said shaft in position to abut said collar for moving said collar axially to adjust the position of said cone, and a locking collar having internal serrations complementary to the external serrations of said spacing collar and of said nut and slidably movable into engagement with both said spacing collar and said nut to prevent relative rotation thereof.

7. Adjusting mechanism for an anti-friction shaft bearing of the tapered race and cone type, comprising a bearing cone splined for axial movement only on the shaft, an externally serrated collar formed integrally with said bearing cone, a nut having external serrations similar to the serrations of said collar mounted to abut said cone and rotatably threaded on said shaft to move said cone axially to adjust its position, and a locking sleeve having internal serrations complementary to the external serrations of said collar and said nut and slidably movable into engagement with both said collar and said nut to prevent relative rotation thereof.

8. In a mechanism, an element presenting closely spaced axially disposed peripheral serrations, a second relatively rotatable element presenting matching peripheral serrations arranged to register with the serrations of said first element at numerous positions of relative angular adjustment, a locking sleeve having complementary internal serrations adapted to slide axially into engagement with the peripheral serrations of both said elements when they are in registering alignment for locking them against relative rotation, and means for releasably retaining said locking sleeve in locking engagement with said elements.

9. In an anti-friction bearing, a supporting element, a bearing race splined for axial movement only on said supporting element to effect adjustment of said bearing and presenting integrally formed serrations, an adjusting nut rotatably threaded on said supporting element adjacent to said race for effecting adjusting movement thereof, and means carried by said nut for releasably engaging said serrations in said race in manner to prevent unintentional movement of said nut relative to said race.

10. In a bearing adjusting apparatus for a shaft bearing, a bearing element splined for axial adjusting movement only on the shaft and presenting external serrations, an adjusting nut rotatably threaded on said shaft adjacent to said bearing element to adjust it, said nut presenting external serrations matching the serrations on said bearing element, and a locking collar presenting internal serrations complementary to the external serrations on said bearing element and on said nut, said collar being adapted to be moved axially into engagement with said serrations for preventing unintentional rotation of said nut relative to said bearing element.

11. In a bearing adjusting apparatus for an anti-friction bearing having a support and an externally serrated bearing element slidably splined for axial adjusting movement only on said support, a nut rotatably threaded on said support adjacent to said serrated bearing element for effecting axial movement thereof, and a serrated locking collar slidably carried by said nut for axial movement only into releasable locking engagement with said serrated bearing element to prevent unintentional movement of said nut after adjustment of said bearing has been effected.

12. In an adjusting mechanism for a bearing of the axially adjustable type, a supporting structure, a bearing adjusting element slidably mounted for axial movement only on said supporting structure and presenting a circular series of serrations, an adjusting nut presenting a similar series of serrations and rotatably threaded on said supporting structure adjacent to said bearing adjusting element for effecting axial adjusting movement thereof, and a locking collar having serrations complementary to those of said bearing element and said nut and disposed to releasably engage the serrations of both said element and said nut for retaining said nut in adjusted position.

13. In an adjustable bearing of the tapered face and cone type, a bearing cone presenting closely spaced locking serrations, a threaded shaft disposed to support said cone for axial adjusting movement therealong, means to prevent relative rotation between said cone and said shaft, an adjusting nut threaded on said shaft and operative to move said cone in adjusting the bearing, and a locking sleeve having serrations complementary to said serrations on said cone, said sleeve being slidably mounted on said nut for axial movement only, whereby said serrations on said sleeve may be moved into locking engagement with the serrations on said cone to lock said nut in adjusted position.

14. In a screw and nut mechanism, a shaft presenting external screw threads, a nut element having complementary internal screw threads disposed in threaded engagement with said shaft and presenting peripheral serrations, a collar mounted on said shaft and secured against rotation relative thereto, said collar presenting similar peripheral serrations, and a locking sleeve having internal serrations complementary to the serrations on said nut and said collar and adapted to be moved axially into engagement with both said nut and said collar to lock said nut against rotation relative to said shaft.

15. An adjusting mechanism for an axially adjustable bearing, comprising a bearing element presenting locking serrations, a nut presenting similar locking serrations and mounted to rotate relative to said bearing element to move it axially in adjusting the bearing, and a locking member having serrations complementary to the serrations of said bearing element and said nut and slidably movable into engagement with both said bearing element and said nut to prevent relative rotation thereof.

16. In an adjusting mechanism for a shaft bearing of the tapered race and cone type, an externally serrated element slidably mounted on the shaft for axial movement only in adjusting the bearing, an externally serrated adjusting nut rotatably threaded on said shaft for exerting force upon said element to adjust said bearing, and an internally serrated complementary locking collar disposed to slidably engage the serrations of said nut and said element for preventing relative rotation therebetween after adjustment of said bearing.

JOSEPH B. ARMITAGE.

CERTIFICATE OF CORRECTION.

Patent No. 2,332,684.  October 26, 1943.

JOSEPH B. ARMITAGE.

It is hereby certified that error appears in the printed specification of the above numbered patent requiring correction as follows: Page 5, second column, line 13, claim 13, for "face" read --race--; and that the said Letters Patent should be read with this correction therein that the same may conform to the record of the case in the Patent Office.

Signed and sealed this 14th day of December, A. D. 1943.

(Seal)

Henry Van Arsdale,
Acting Commissioner of Patents.